United States Patent
Hasegawa et al.

(10) Patent No.: US 9,688,123 B2
(45) Date of Patent: Jun. 27, 2017

(54) LOAD TRANSMISSION MEMBER

(71) Applicant: NIFCO INC., Yokosuka-shi, Kanagawa (JP)

(72) Inventors: Takahiro Hasegawa, Yokosuka (JP); Katsusaburo Tsuchikawa, Kariya (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 0 days.

(21) Appl. No.: 15/045,897

(22) Filed: Feb. 17, 2016

(65) Prior Publication Data
US 2016/0244100 A1  Aug. 25, 2016

(30) Foreign Application Priority Data

Feb. 20, 2015 (JP) .................................. 2015-032260

(51) Int. Cl.
*B60J 5/04* (2006.01)

(52) U.S. Cl.
CPC ........... *B60J 5/0451* (2013.01); *B60J 5/0425* (2013.01)

(58) Field of Classification Search
CPC ........ B60R 21/04; B60R 21/0428; B60J 5/04; B60J 5/0412; B60J 5/0413; B60J 5/0416; B60J 5/0451; B60J 5/0452; B60J 5/0425
USPC .............................. 296/146.5, 146.6, 187.12
See application file for complete search history.

(56) References Cited

U.S. PATENT DOCUMENTS

| | | | | |
|---|---|---|---|---|
| 5,857,702 A * | 1/1999 | Suga | ...................... | B60J 5/0451 188/377 |
| 5,865,496 A * | 2/1999 | Odan | ...................... | B60J 5/0425 280/751 |
| 6,688,671 B2 * | 2/2004 | Fukutomi | .............. | B60J 5/0425 296/146.6 |
| 7,695,051 B2 * | 4/2010 | Abe | ..................... | B60R 21/0428 296/146.6 |
| 7,726,727 B2 * | 6/2010 | Bhattacharjee | ........ | B60J 5/0452 296/146.6 |
| 7,857,375 B2 * | 12/2010 | Huttsell | ................. | B60J 5/0425 296/146.6 |
| 8,678,476 B2 * | 3/2014 | Hirose | .................. | B60R 21/055 296/187.05 |
| 8,702,153 B2 * | 4/2014 | Kurokawa | ............. | B60J 5/0451 296/146.6 |
| 2001/0017476 A1 * | 8/2001 | Nishikawa | ............. | B60J 5/0416 296/146.6 |
| 2002/0007598 A1 * | 1/2002 | Nishikawa | ............. | B60J 5/0416 49/502 |

(Continued)

FOREIGN PATENT DOCUMENTS

| | | | | |
|---|---|---|---|---|
| JP | 2009-006838 A | | 1/2009 | |
| JP | 2009-196434 | * | 9/2009 | ................ B60J 5/00 |
| JP | 2009-241649 | * | 10/2009 | ................ B60J 5/00 |

*Primary Examiner* — Gregory Blankenship
(74) *Attorney, Agent, or Firm* — Manabu Kanesaka

(57) ABSTRACT

A load transmission member includes an outside load transmission member attached to one face of a panel member; an inside load transmission member attached to a position corresponding to the outside load transmission member at the other face of the panel member, and a temporary attachment device provided on at least one of the outside load transmission member or the inside load transmission member for temporarily attaching to the panel member. A load is transmitted through the panel member from the outside load transmission member to the inside load transmission member.

9 Claims, 14 Drawing Sheets

(56) References Cited

U.S. PATENT DOCUMENTS

| | | | | |
|---|---|---|---|---|
| 2002/0113462 A1* | 8/2002 | Heranney | ........... | B60R 21/0428 |
| | | | | 296/187.12 |
| 2007/0013206 A1* | 1/2007 | Huttsell | ................. | B60J 5/0425 |
| | | | | 296/146.6 |
| 2007/0040411 A1* | 2/2007 | Dauvergne | ............. | B60J 5/0416 |
| | | | | 296/146.7 |
| 2007/0262612 A1* | 11/2007 | Cowelchuk | ......... | B60R 21/0428 |
| | | | | 296/187.12 |
| 2012/0152674 A1* | 6/2012 | Fukuo | ..................... | F16F 7/121 |
| | | | | 188/377 |
| 2014/0035322 A1* | 2/2014 | Sakhara | ................. | B62D 25/02 |
| | | | | 296/187.12 |
| 2014/0048367 A1* | 2/2014 | Tani | ...................... | B60J 5/0451 |
| | | | | 188/377 |
| 2015/0123423 A1* | 5/2015 | Hasegawa | .............. | B60J 5/0427 |
| | | | | 296/146.6 |
| 2015/0314808 A1* | 11/2015 | Jenkins | ................ | B62D 21/157 |
| | | | | 296/187.12 |
| 2016/0244100 A1* | 8/2016 | Hasegawa | ........... | B62D 21/157 |

\* cited by examiner ial invention is to provide a load transmission

LOAD TRANSMISSION MEMBER

BACKGROUND OF THE INVENTION AND RELATED ART STATEMENT

The present invention relates to a load transmission member attached to a panel member.

There is a vehicle, especially, an automobile provided with a load transmission member for transmitting a load from an outside of an auto body to the auto body through a seat rod of an automobile seat relative to an impact from a side face of the automobile body, i.e. a side impact (for example, see Patent Document 1).

In the Patent Document 1, the load transmission member (a side impact pad) is formed by an outer-side pad disposed between an outer panel and an inner panel of an automobile interior door, and an inner-side pad disposed on an opposite side of the outer-side pad by sandwiching the inner panel, i.e. between the inner panel and a door trim.

Patent Document 1: Japanese Patent Publication No. 2009-6838.

However, the side impact pad disclosed in the Patent Document 1 has a structure of sandwiching the inner panel by the outer-side pad and the inner-side pad, and in that state, attaching the outer-side pad and the inner-side pad to the inner panel by a screw clamp and the like, so that the side impact pad is difficult to be attached and there is a possibility that it requires time for an attachment operation.

In view of the aforementioned circumstances, an object of the present invention is to provide a load transmission member wherein the attachment operation to the panel member is easily carried out.

Further objects and advantages of the invention will be apparent from the following description of the invention.

SUMMARY OF THE INVENTION

A load transmission member according to the first aspect comprises a first load transmission member attached to one face of a panel member; a second load transmission member attached to a position corresponding to the first load transmission member at the other face of the panel member, wherein a load is transmitted through the panel member from the first load transmission member to the second load transmission member; and a temporary attachment device provided on at least one of the first load transmission member or the second load transmission member for temporarily attaching to the panel member.

In the load transmission member according to the first aspect, at least one of the first load transmission member or the second load transmission member can be temporarily attached to the panel member by the temporary attachment device, so that, for example, compared to a structure which cannot temporarily attach, an attachment operation of the load transmission member to the panel member becomes easy.

As for the load transmission member according to a second aspect, in the load transmission member according to the first aspect, the temporary attachment device includes a hooking portion hooked on a hooked portion provided in the panel member.

In the load transmission member according to the second aspect, at least one of the first load transmission member or the second load transmission member can be temporarily attached to the panel member by a simple operation which hooks the hooking portion on a hooked portion of the panel member.

As for the load transmission member according to a third aspect, in the load transmission member according to the first aspect or the second aspect, the temporary attachment device includes an engagement claw inserted into a marginal portion of an engagement hole provided in the panel member to be engaged.

In the load transmission member according to the third aspect, at least one of the first load transmission member or the second load transmission member can be temporarily attached to the panel member by a simple operation of engaging the engagement claw with the marginal portion of the engagement hole of the panel member.

As for the load transmission member according to a fourth aspect, the load transmission member according to any one of the first to third aspects, further includes an engagement device engaging the first load transmission member with the second load transmission member in a state of sandwiching the panel member.

In the load transmission member according to the fourth aspect, in the state of sandwiching the panel member, the first load transmission member and the second load transmission member are engaged by the engagement device. Consequently, when the load is transmitted to the second load transmission member from the first load transmission member through the panel member, a positional displacement between the first load transmission member and the second load transmission member can be controlled. Thereby, the load from the first load transmission member can be reliably transmitted to the second load transmission member.

As for the load transmission member according to a fifth aspect, in the load transmission member according to the fourth aspect, the engagement device includes a fastener for fastening the first load transmission member and the second load transmission member in the state of sandwiching the panel member by passing through an attachment hole provided in the panel member and attaching the first load transmission member and the second load transmission member to the panel member; and insertion holes respectively provided in the first load transmission member and the second load transmission member, into which the fastener is inserted.

In the load transmission member according to the fifth aspect, in a state wherein the first load transmission member and the second load transmission member sandwich the panel member, the fastener is inserted into the insertion hole of the second load transmission member (or the insertion hole of the first load transmission member) through the insertion hole of the first load transmission member (or the insertion hole of the second load transmission member) and the attachment hole of the panel member to fasten the first load transmission member and the second load transmission member so as to firmly fix the first load transmission member and the second load transmission member to the panel member. Thereby, the load from the first load transmission member can be more reliably transmitted to the second load transmission member.

As for the load transmission member according to a sixth aspect, in the load transmission member according to the fifth aspect, in a marginal portion of any one of the insertion holes of the first load transmission member or the second load transmission member, there is provided a positioning protrusion inserted into the attachment hole.

In the load transmission member according to the sixth aspect, the protrusion provided in the marginal portion of any one of the insertion holes of the first load transmission member or the second load transmission member is inserted into the attachment hole of the panel member so as to carry out the positioning of the insertion hole wherein the protrusion is provided in the marginal portion, and the attachment hole. Thus, since the insertion hole where the protrusion is provided in the marginal portion and the attachment hole are easily positioned, a fastening operation using the fastener becomes easy, and the attachment operation of the load transmission member to the panel member becomes easy further.

As for the load transmission member according to a seventh aspect, in the load transmission member according to any one of the first to sixth aspects, at least one of the first load transmission member or the second load transmission member further includes a handle portion.

In the load transmission member according to the seventh aspect, at least one of the first load transmission member or the second load transmission member can be temporarily attached to the panel member while holding the handle portion, so that the attachment operation of the load transmission member to the panel member becomes easy further.

As for the load transmission member according to an eighth aspect, in the load transmission member according to any one of the first to seventh aspects, the panel member is an inner panel for an automobile door, the first load transmission member is attached to a face of the inner panel at an outer side of an auto body, and the second load transmission member is attached to a face of an inside of the inner panel.

In the load transmission member according to the eighth aspect, the first load transmission member is attached to the face of the inner panel of the automobile door at an outer side of the auto body, and the second load transmission member is attached to the face of the inner panel inside the auto body. Consequently, in a case wherein a load acts on the automobile door from the outside of the auto body, one portion of the load acts on the first load transmission member, and a load received at the first load transmission member is transmitted to the second load transmission member through the panel member. The load received at the second load transmission member is transmitted to the auto body, for example, through a fixation member fixed to the auto body, and is absorbed.

Since the present invention has the aforementioned structure, the load transmission member whose attachment operation to the panel member is easily carried out can be provided.

DETAILED DESCRIPTION OF PREFERRED EMBODIMENTS

Next, one embodiment of a load transmission member according to the present invention will be explained with reference to FIGS. 1 to 14.

Incidentally, an arrow UP shown in a part of the drawings represents an upper side of an auto body; an arrow IN represents an inside of the auto body in a width direction, and an arrow FR represents the front of the auto body.

Figure 12:
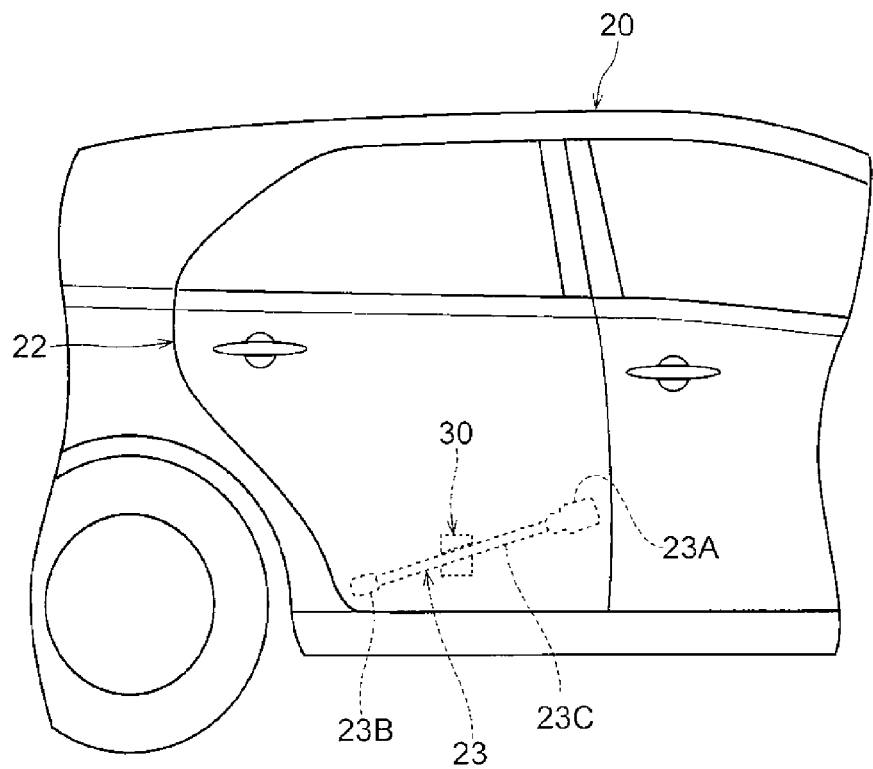
FIG. 12 is a side view of the auto body wherein a side door to which the load transmission member is attached is seen from the outside of the auto body according to the first embodiment.

As shown in FIG. 12, at a rear side portion of an auto body 20 of an automobile, there is provided a rear side door 22 (one example of an automobile door of the present invention). Also, inside the rear side door 22, there are provided an impact beam 23 and a load transmission member 30 at positions corresponding to a seat portion of a passenger sitting seat (not shown in the drawings). The impact beam 23 has a long shape, and a front end portion 23A is fixed to a front end portion of the rear side door 22, and a back end portion 23B is fixed to a back end portion of the rear side door 22, respectively.

Figure 13:
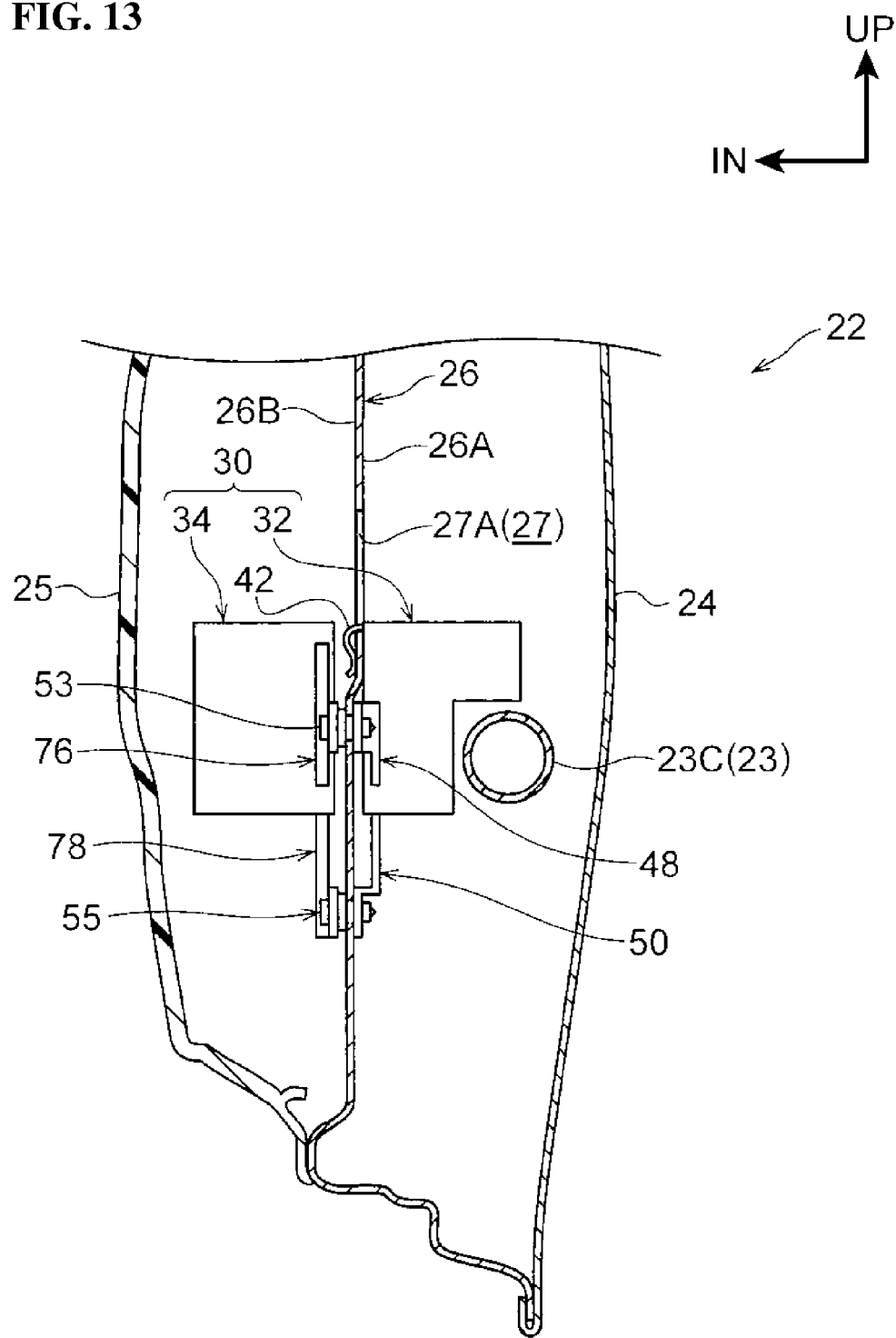
FIG. 13 is a cross-sectional view wherein the side door to which the load transmission member is attached is taken along an up-and-down direction of the auto body according to the first embodiment.

As shown in FIG. 13, the rear side door 22 comprises an outer panel 24 provided on an outside of the auto body, and an inner panel 26 provided on the inside of the auto body. Incidentally, the inner panel 26 of the present embodiment is one example of the panel member of the present invention.

In the outer panel 24 and the inner panel 26, respective peripheral edge portions are connected by welding and the like. Also, a space is formed between the outer panel 24 and the inner panel 26, and in this space, the later-described outside load transmission member 32 and impact beam 23 are disposed. An intermediate portion 23C except for both end portions of the impact beam 23 has a cylindrical shape, and is disposed along a reverse face of the outer panel 24 of the rear side door 22. Also, in the inside of the auto body (here, an automobile interior side) of the inner panel 26, there is attached a door interior material (a door trim) 25.

Next, a structure of the load transmission member 30 will be explained.

Figure 1:
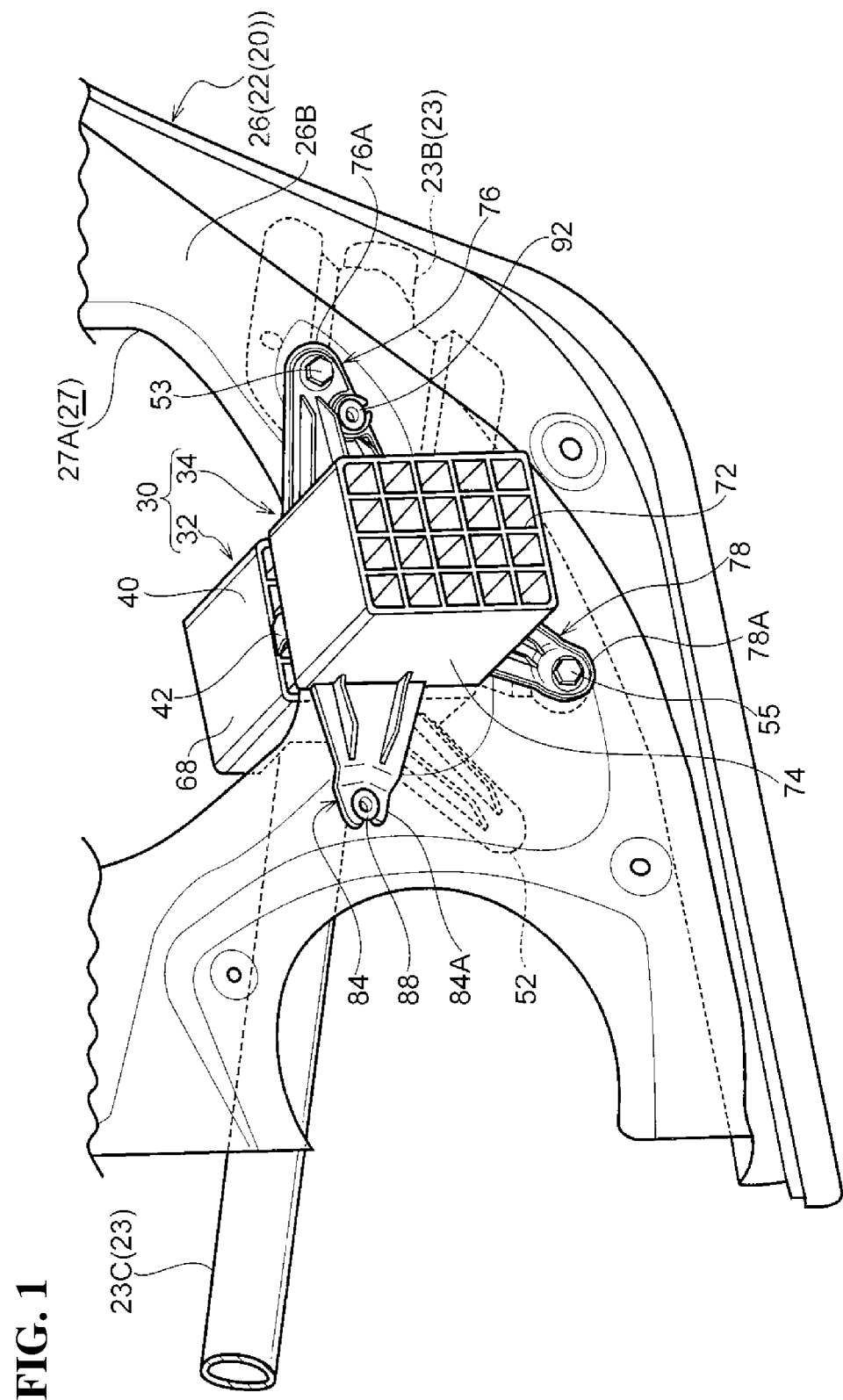
FIG. 1 is a perspective view wherein a load transmission member is seen from an inside of an auto body in a state wherein the load transmission member is attached to a panel member according to the first embodiment.
Figure 2:
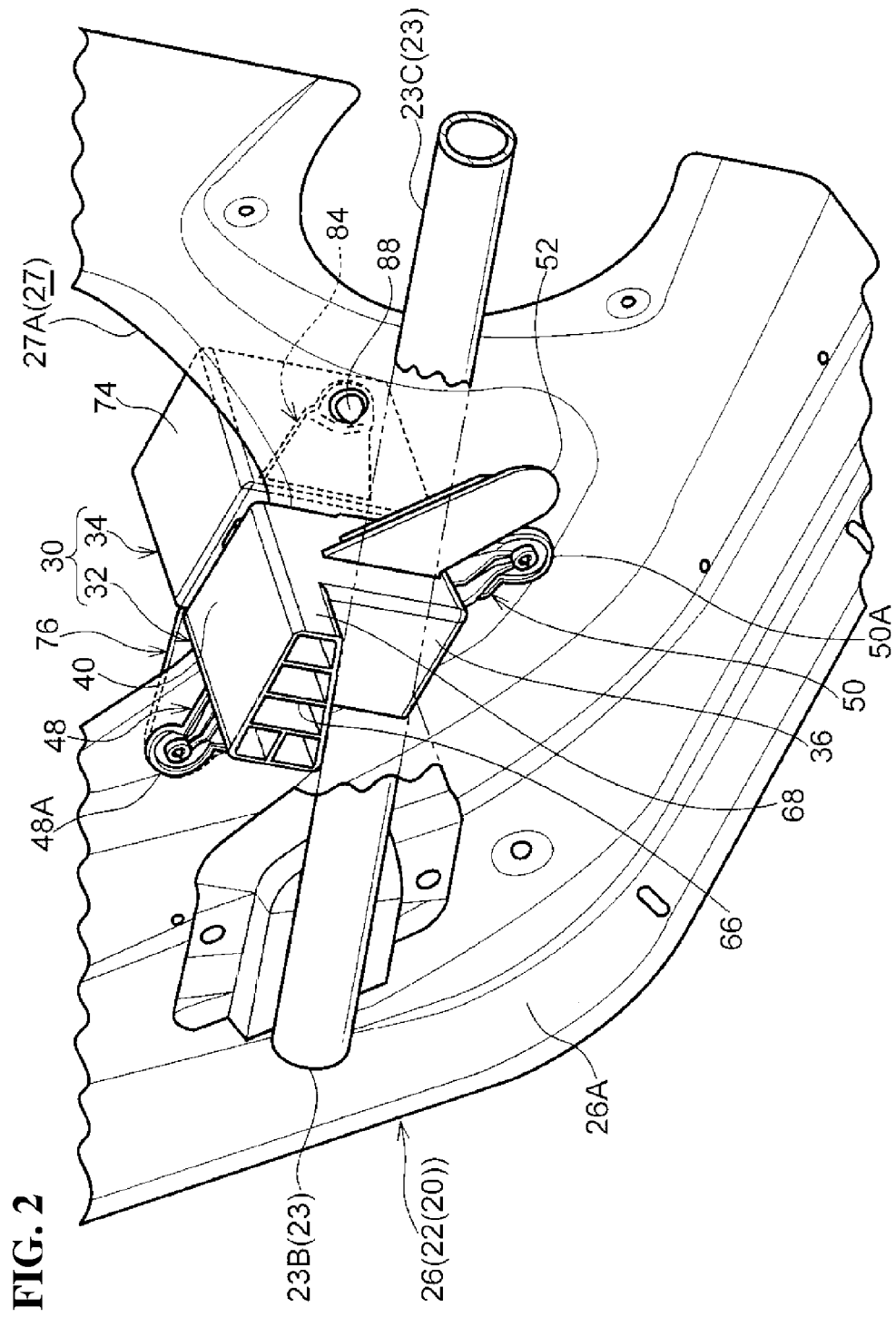
FIG. 2 is a perspective view wherein the load transmission member is seen from an outside of the auto body in the state wherein the load transmission member is attached to the panel member according to the first embodiment.
Figure 14:
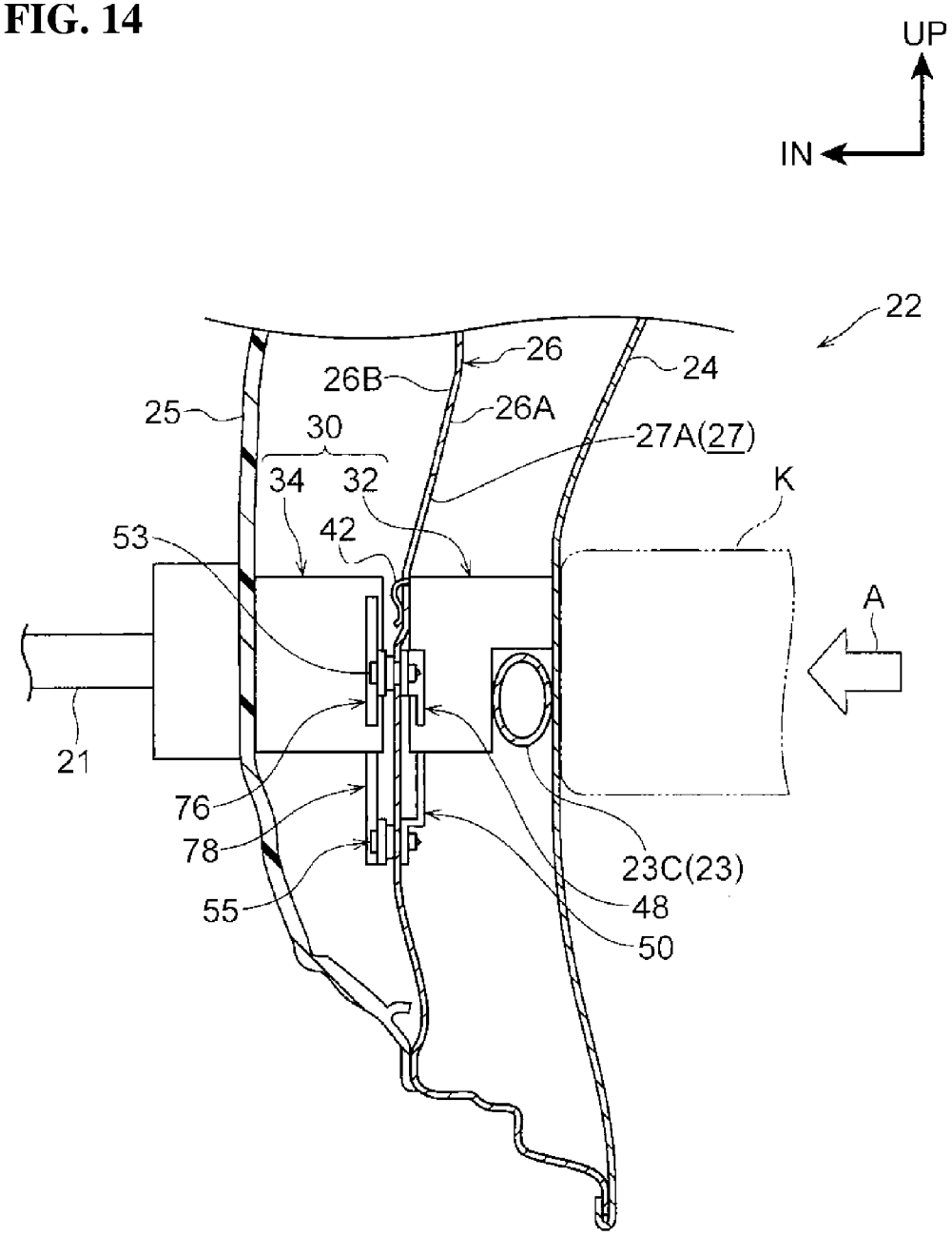
FIG. 14 is a cross-sectional view showing a state wherein a load acts on the side door in FIG. 13 from the outside of the auto body, and wherein the side door is taken along the up-and-down direction of the auto body.

As shown in FIG. 1 and FIG. 2, the load transmission member 30 comprises the outside load transmission member 32 attached to a face 26A of the outside of the auto body, which is one face of the inner panel 26; and an inside load transmission member 34 attached to a position corresponding to the outside load transmission member 32 at a face 26B of the inside of the auto body, which is the other face of the inner panel 26. As shown in FIG. 14, in a case wherein a load acts on the rear side door 22 from the outside, one portion of the load is transmitted to the inside load transmission member 34 through the inner panel 26 from the outside load transmission member 32. Incidentally, details of a load transmission will be described later. Incidentally, the outside load transmission member 32 of the present embodiment is one example of a first load transmission member of the present invention, and the inside load transmission member 34 of the present embodiment is one example of a second load transmission member of the present invention.

Figure 3:
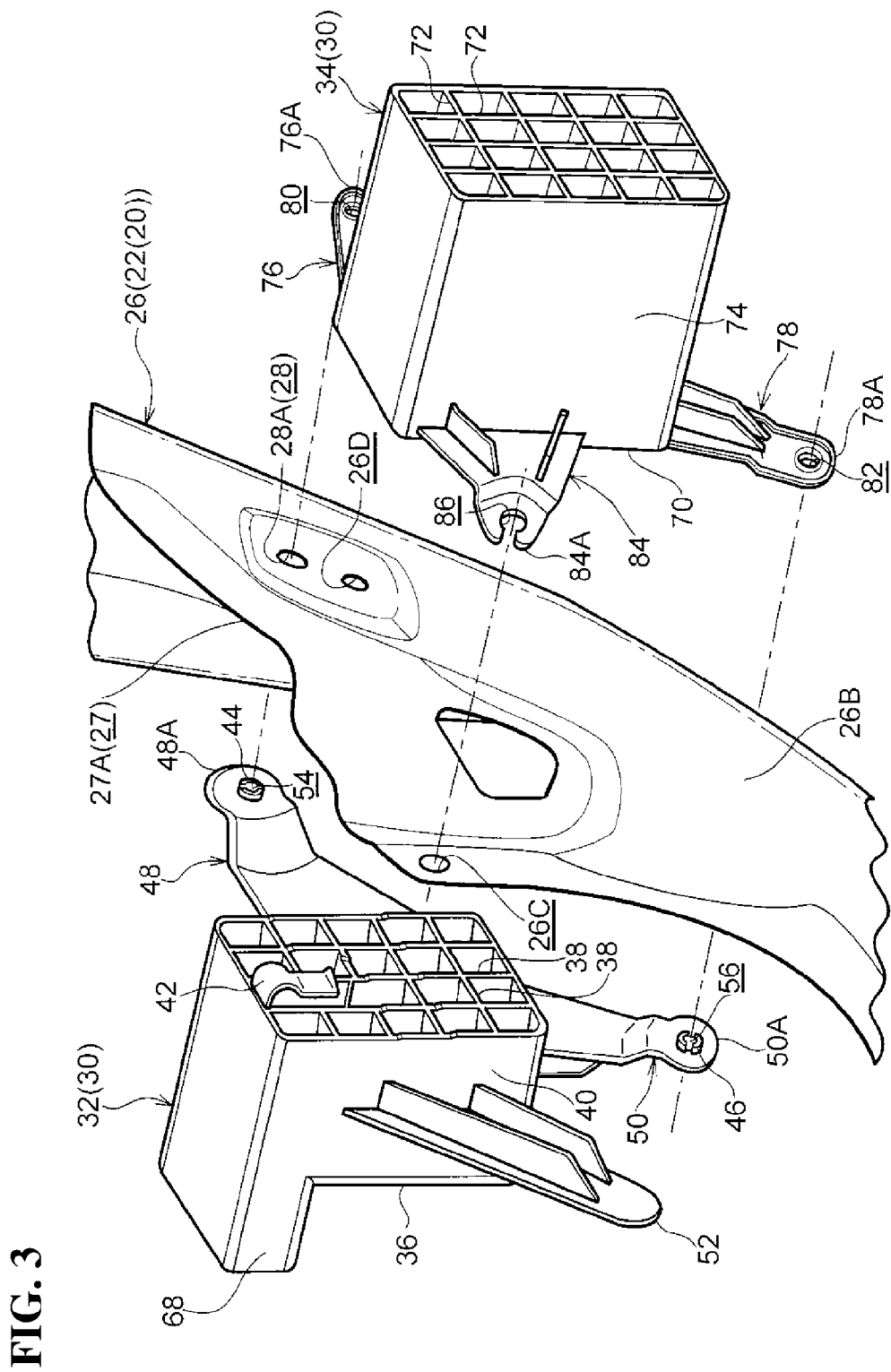
FIG. 3 is an exploded perspective view showing a state wherein the load transmission member is exploded to a first load transmission member and a second load transmission member according to the first embodiment.
Figure 5:
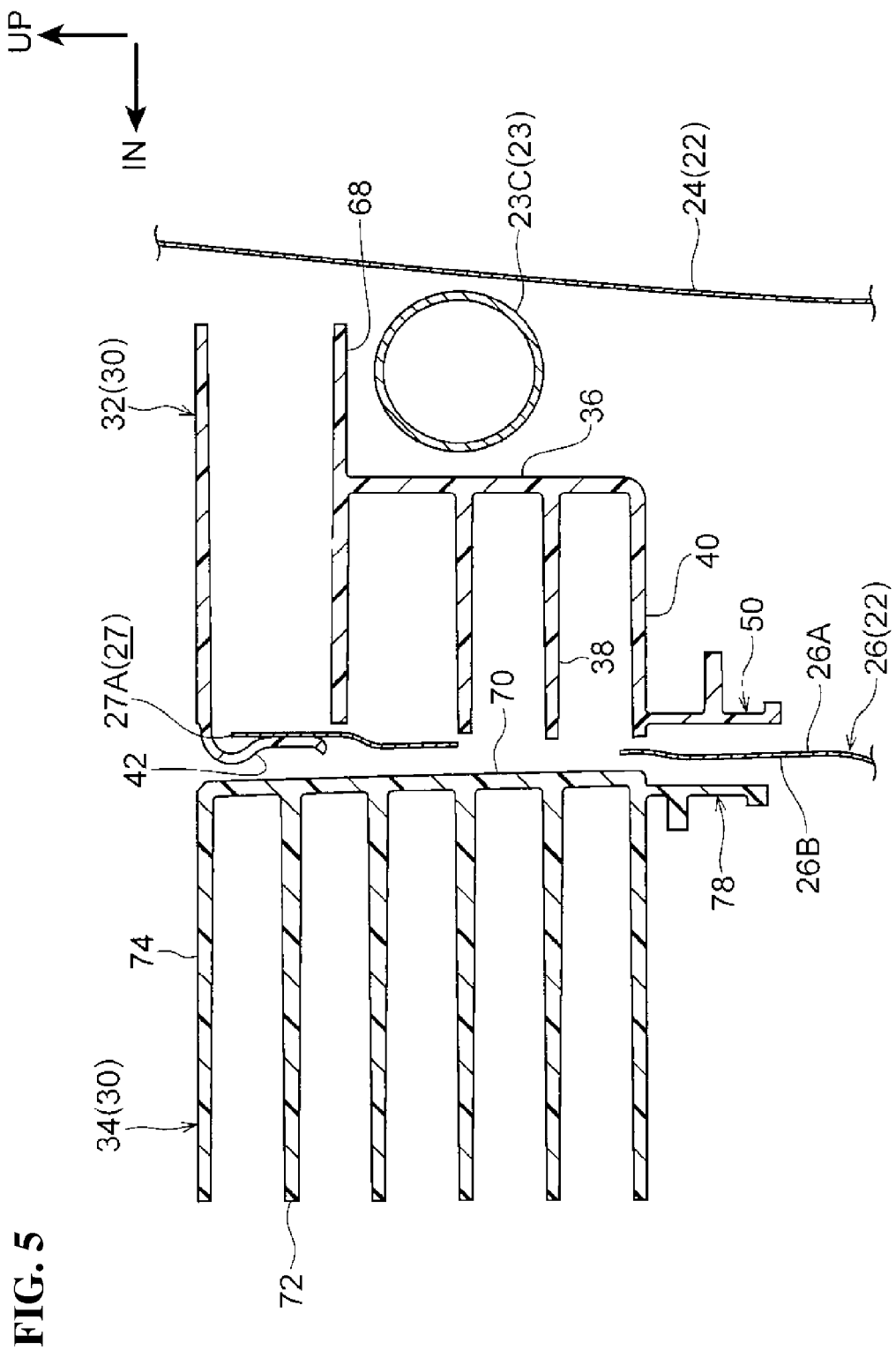
FIG. 5 is an end view taken along a line 5-5 in FIG. 4.

As shown in FIG. 3 and FIG. 5, the outside load transmission member 32 comprises a plate portion 36; a plurality of ribs 38 provided to stand on one face (a left side face in FIG. 5) of the plate portion 36; and a surrounding wall 40 provided to stand on one face of the plate portion 36 and surrounding all the ribs 38.

The plate portion 36 has approximately a square shape, and there is formed the surrounding wall 40 along a peripheral edge portion. An external shape of the surrounding wall 40 has approximately the same square cylinder shape as the plate portion 36, and inside the surrounding wall 40, there is arranged the plurality of ribs 38 approximately in a lattice manner. In the ribs 38, a height from the plate portion 36 is the same as a height of the surrounding wall 40. Namely, tip faces of the ribs 38 become one face with a tip face of the surrounding wall 40.

Also, the outside load transmission member 32 comprises a hooking portion 42 for temporarily attaching to the inner panel 26; claw portions 44 and 46; attachment portions 48 and 50 for attaching to the inner panel 26; and a handle portion 52.

As shown in FIG. 3 and FIG. 5, the hooking portion 42 is a plate-like portion extending by bending toward the inside (a lower side in FIG. 3 and FIG. 5) of the surrounding wall 40 from a tip portion of one wall portion (an upper wall portion in FIG. 3 and FIG. 5) of the surrounding wall 40, and is hooked on a marginal portion 27A of an opening 27 provided in the inner panel 26. The hooking portion 42 is hooked on the marginal portion 27A of the opening 27 of the inner panel 26, so that the outside load transmission member 32 is temporarily attached to the inner panel 26. Incidentally, the hooking portion 42 of the present embodiment is one example of a temporary attachment device of the present invention, and the marginal portion 27A of the opening 27 of the inner panel 26 of the present embodiment is one example of a hooked portion of the present invention.

As shown in FIG. 3, the attachment portion 48 is a plate-like portion provided to stand on a wall portion (a right side wall portion in FIG. 3) adjacent to the wall portion where the hooking portion 42 of the surrounding wall 40 is provided, and in a tip portion 48A, there is formed an insertion hole 54 (see FIG. 8) into which a fastener 53 (in the present embodiment, a screw member) is inserted.

On the other hand, the attachment portion 50 is a plate-like portion provided to stand on a wall portion (a lower wall portion in FIG. 3) on a side opposite to the wall portion where the hooking portion 42 of the surrounding wall 40 is provided, and at a tip portion 50A, there is formed an insertion hole 56 (see FIG. 9) into which a fastener 55 (a screw member in the present embodiment) is inserted. The insertion holes 54 and 56 respectively provided in the attachment portions 48 and 50 are provided at positions respectively corresponding to attachment holes 28 and 29 provided in the inner panel 26. Incidentally, in the present embodiment, a diameter of the insertion hole 54 is smaller than that of the attachment hole 28, and a diameter of the insertion hole 56 is smaller than that of the attachment hole 29. Also, in the present embodiment, the diameter of the insertion hole 54 is set to have a size (see FIG. 8) wherein a screw portion of the fastener 53 is twisted in, and the diameter of the insertion hole 56 is set to have a size (see FIG. 9) wherein a screw portion of the fastener 55 is twisted in.

Figure 11:
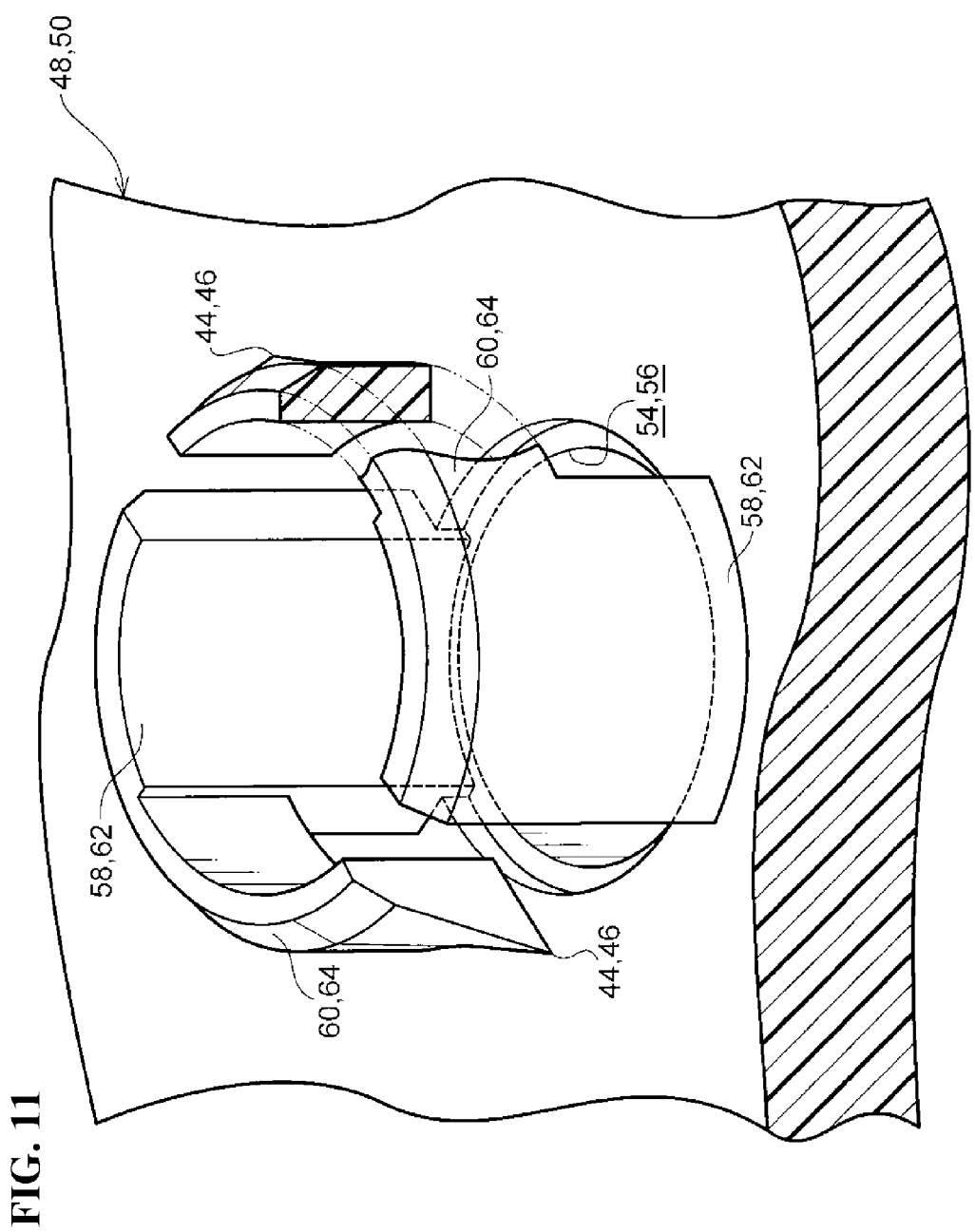
FIG. 11 is a perspective view of a claw portion according to the first embodiment.

As shown in FIG. 11, at a marginal portion of the insertion hole 54 provided in the tip portion 48A of the attachment portion 48, there is provided a pair of positioning protrusions 58 inserted into the attachment hole 28 by sandwiching the insertion hole 54. An outer peripheral face of the protrusion 58 has a shape along an inner peripheral face of the attachment hole 28. When the pair of protrusions 58 is inserted into the attachment hole 28, the respective outer peripheral faces abut against the inner peripheral face of the attachment hole 28, so that the insertion hole 54 relative to the attachment hole 28 is positioned.

Also, at a tip portion of the protrusion 58, there is provided an elastically deformable plate-like piece 60 extending while curving along the marginal portion of the insertion hole 54 from the tip portion. A tip of the plate-like piece 60 is a free end. Also, at a tip portion of the plate-like piece 60, there is provided the claw portion 44. The claw portion 44 is a portion projecting from an outer periphery of the tip portion of the plate-like piece 60, and is engageable with a marginal portion 28A of the attachment hole 28. Also, an outer peripheral face of the claw portion 44 inclines in such a way as to project to an outside in a radial direction of the insertion hole 54 toward a root side from a tip side of the protrusion 58. Also, the plate-like piece 60 provided respectively in the pair of protrusions 58 extends in the same direction along the marginal portion of the insertion hole 54. Here, when the protrusion 58 is inserted into the attachment hole 28, the outer peripheral face of the claw portion 44 abuts against the marginal portion 28A of the attachment hole 28, and the plate-like piece 60 elastically deforms in such a way that the claw portion 44 retracts to an inside in the radial direction of the insertion hole 54. Then, after the claw portion 44 passes through the attachment hole 28, the plate-like piece 60 is restored, and the respective claw portions 44 engage with the marginal portion of the attachment hole 28 (see FIG. 8). Namely, the pair of protrusions 58 is inserted into the attachment hole 28, and the respective claw portions 44 are respectively engaged with the marginal portion 28A of the attachment hole 28, so that in a state wherein the attachment hole 28 and the insertion hole 54 are positioned, the outside load transmission member 32 is temporarily attached to the inner panel 26. Incidentally, the claw portion 44 of the present embodiment is one example of the temporary attachment device of the present invention, and the attachment hole 28 of the present embodiment is the attachment hole of the present invention, and one example of an engagement hole.

Also, at the marginal portion of the insertion hole 56 provided in the tip portion 50A of the attachment portion 50, there is provided a pair of positioning protrusions 62 to be inserted into the attachment hole 29 by sandwiching the insertion hole 56. An outer peripheral face of the protrusion 62 has a shape along the inner peripheral face of the attachment hole 29. When the pair of protrusions 62 is inserted into the attachment hole 29, the respective outer peripheral faces contact with the inner peripheral face of the attachment hole 29, and the insertion hole 56 is positioned relative to the attachment hole 29.

At a tip portion of the protrusion 62, there is provided an elastically deformable plate-like piece 64 extending while curving along the marginal portion of the insertion hole 56 from the tip portion. A tip of the plate-like piece 64 is a free end. Also, at a tip portion of the plate-like piece 64, there is provided the claw portion 46. The claw portion 46 is a portion projecting from an outer periphery of the tip portion of the plate-like piece 64, and is engageable with the marginal portion 29A of the attachment hole 29. Also, an outer peripheral face of the claw portion 46 inclines in such a way as to project to an outside in a radial direction of the insertion hole 56 toward a root side from a tip side of the protrusion 62. Also, the plate-like piece 64 provided respectively in the pair of protrusions 62 extends in the same direction along the marginal portion of the insertion hole 56. Here, when the protrusion 62 is inserted into the attachment hole 29, the outer peripheral face of the claw portion 46 abuts against the marginal portion 29A of the attachment hole 29, and the plate-like piece 64 elastically deforms in such a way that the claw portion 46 retracts to the inside in the radial direction of the insertion hole 54. Then, after the claw portion 46 passes through the attachment hole 29, the plate-like piece 64 is restored, and the respective claw portions 46 engage with the marginal portion 29A of the attachment hole 29 (see FIG. 9). Namely, the pair of protrusions 62 is inserted into the attachment hole 29, and the respective claw portions 46 are respectively engaged with the marginal portion 29A of the attachment hole 29, so that in a state wherein the attachment hole 29 and the insertion hole 56 are positioned, the outside load transmission member 32 is temporarily attached to the inner panel 26. Incidentally, the claw portion 46 of the present embodiment is one example of the temporary attachment device of the present invention, and the attachment hole 29 of the present embodiment is the attachment hole of the present invention, and one example of the engagement hole.

As shown in FIG. 2 and FIG. 3, the handle portion 52 is a plate-like portion provided to stand on a wall portion (a left side wall portion in FIG. 3) on a side opposite to the wall portion wherein the attachment portion 50 of the surrounding wall 40 is provided, and is a portion where an operator can hold when attaching the outside load transmission member 32 to the inner panel 26.

Figure 6:
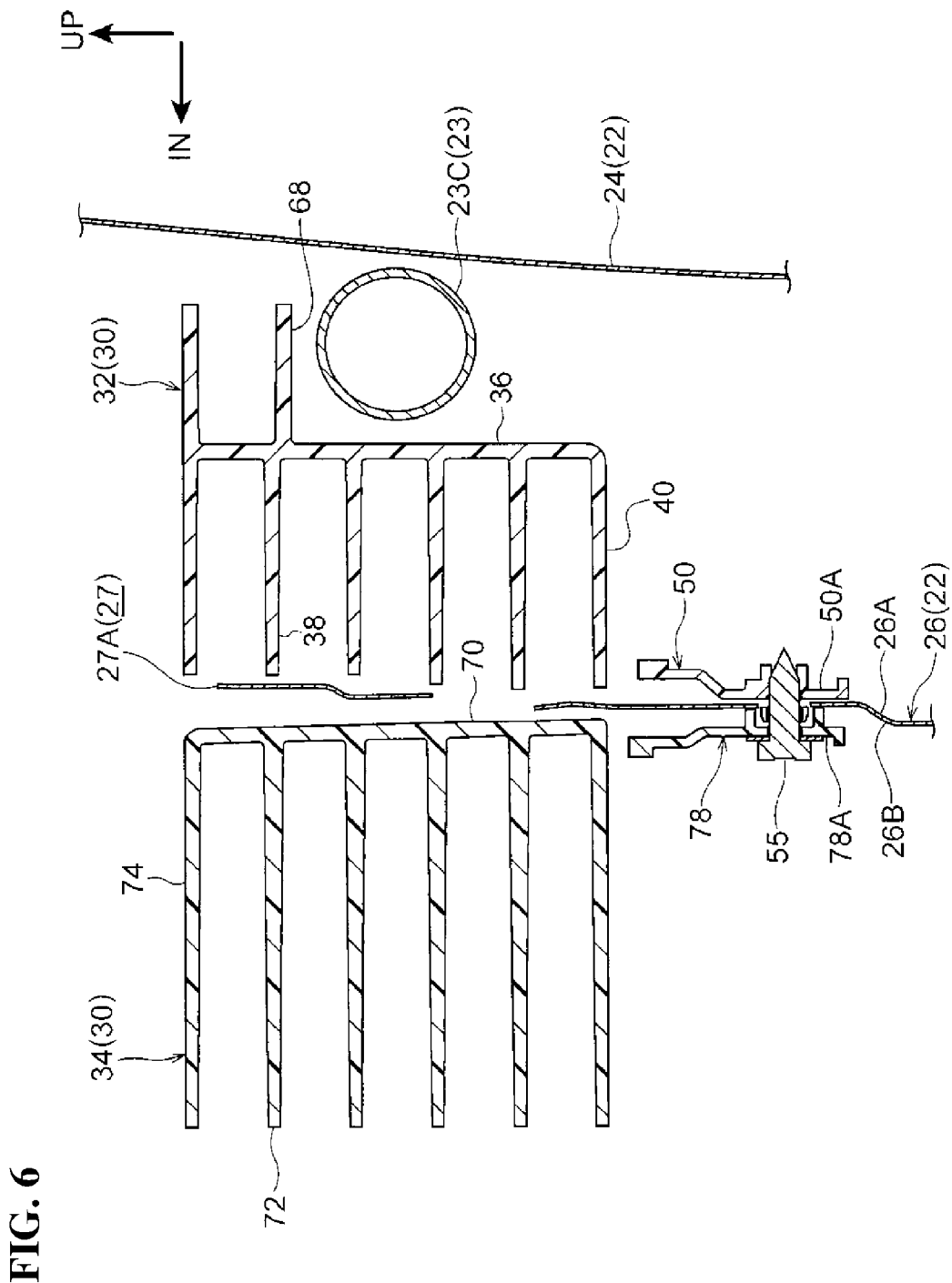
FIG. 6 is an end view taken along a line 6-6 in FIG. 4.
Figure 7:
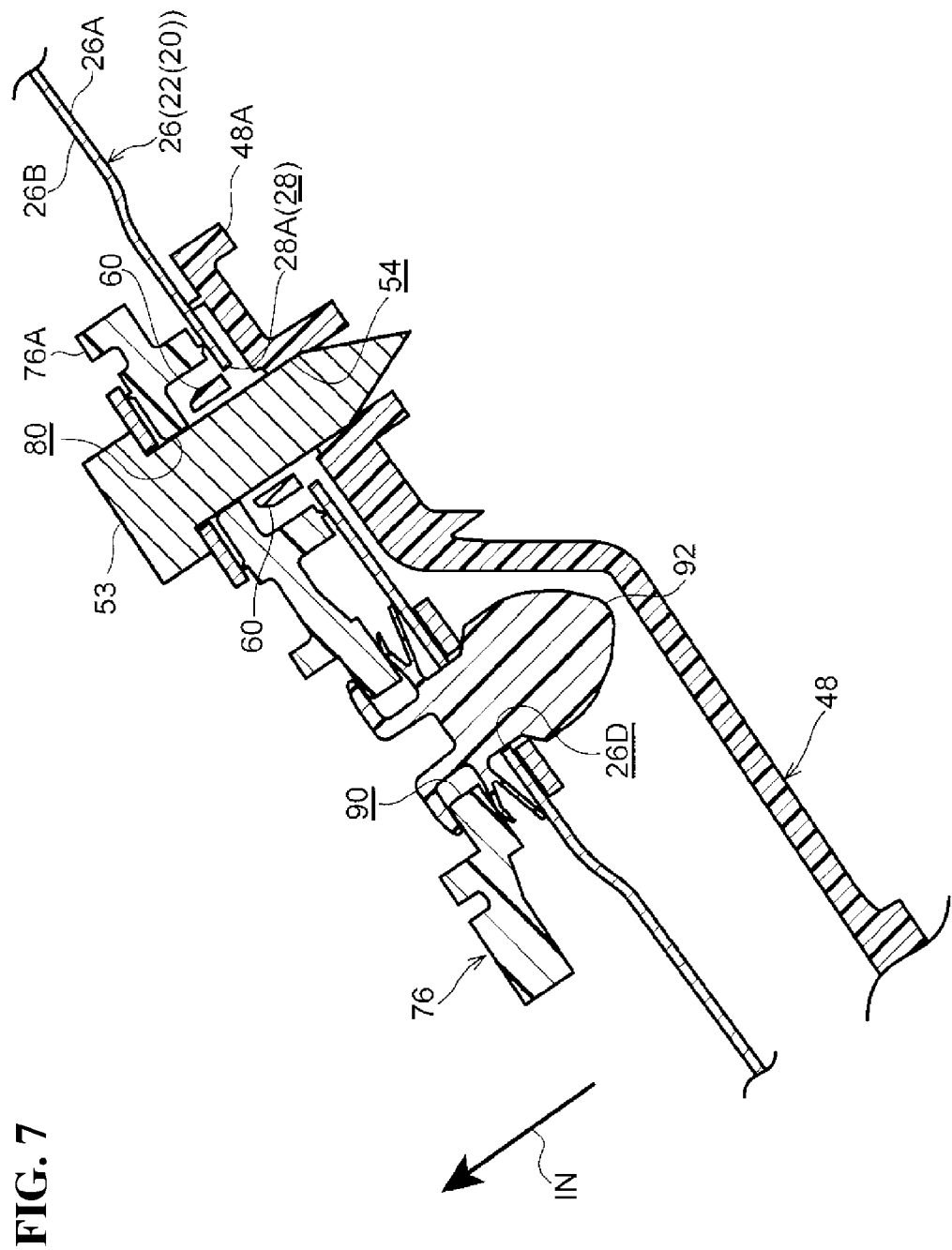
FIG. 7 is an end view taken along a line 7-7 in FIG. 4.
Figure 8:
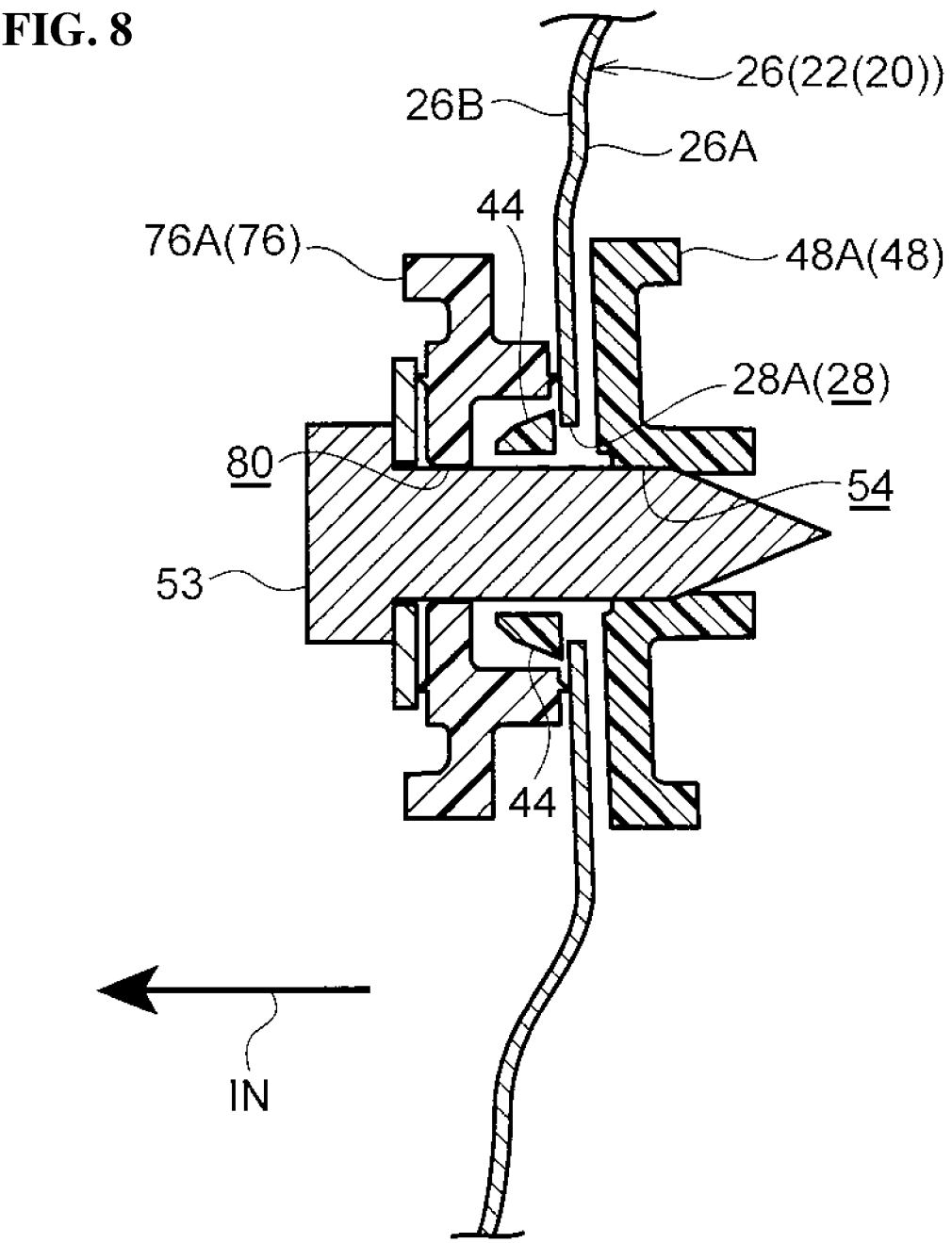
FIG. 8 is an end view taken along a line 8-8 in FIG. 4.
Figure 9:
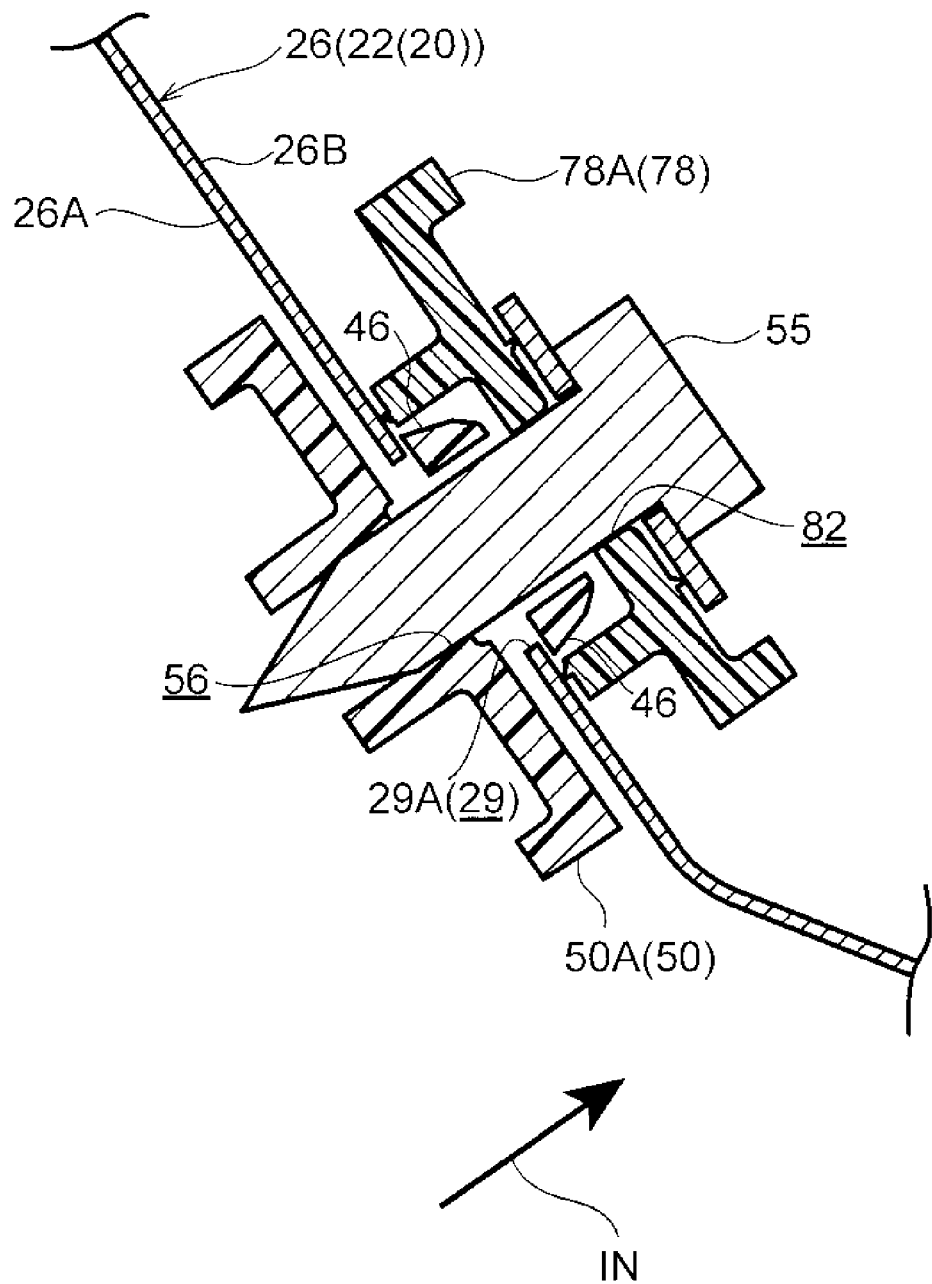
FIG. 9 is an end view taken along a line 9-9 in FIG. 4.
Figure 10:
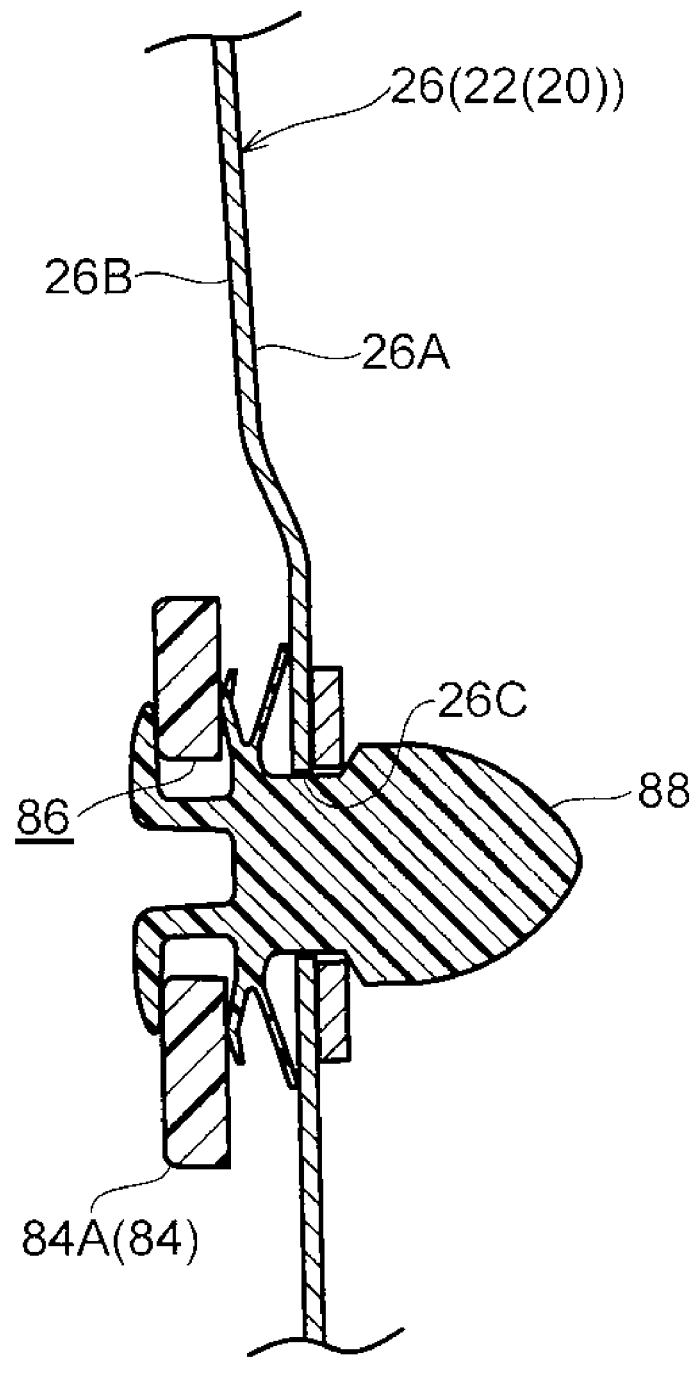
FIG. 10 is an end view taken along a line 10-10 in FIG. 4.

As shown in FIG. 2, FIG. 5, and FIG. 6, the outside load transmission member 32 comprises a plurality of ribs 66 provided to stand on the other face (a right side face in FIG. 5) of the plate portion 36; and a surrounding wall 68 provided to stand on the other face of the plate portion 36 and surrounding all the ribs 66. Incidentally, in the present embodiment, the surrounding wall 40 and the surrounding wall 68 are continued on an upper face and both side faces; however, the present invention is not limited to the aforementioned structure, and the surrounding wall 40 and the surrounding wall 68 may not be continued.

The plurality of ribs 66 and the surrounding wall 68 are provided on a hooking portion 42 side (an upper side in FIG. 3) of the plate portion 36 so as not to interfere with the impact beam 23 (see FIG. 2) in a state wherein the outside load transmission member 32 is attached to the rear side door 22. Also, in the ribs 66, a height from the plate portion 36 is the same as a height of the surrounding wall 68. Namely, tip faces of the ribs 66 become one face with a tip face of the surrounding wall 68. Incidentally, in the plate portion 36 of the present embodiment, there is formed a through-hole at a portion where the hooking portion 42 is formed.

As shown in FIG. 1, FIG. 3, and FIG. 5, the inside load transmission member 34 comprises a plate portion 70; a plurality of ribs 72 provided to stand on one face (the left side face in FIG. 5) of the plate portion 70; and a surrounding wall 74 provided to stand on one face of the plate portion 70 and surrounding all the ribs 72.

The plate portion 70 has approximately a square shape, and there is formed the surrounding wall 74 along a peripheral edge portion. An external shape of the surrounding wall 74 has approximately the same square cylinder shape as the plate portion 70, and inside the surrounding wall 74, there is arranged the plurality of ribs 72 approximately in a lattice manner. In the ribs 72, a height from the plate portion 70 is the same as a height of the surrounding wall 74. Namely, tip faces of the ribs 72 become one face with a tip face of the surrounding wall 74.

Also, the inside load transmission member 34 comprises attachment portions 76 and 78 for attaching to the inner panel 26.

Figure 4:
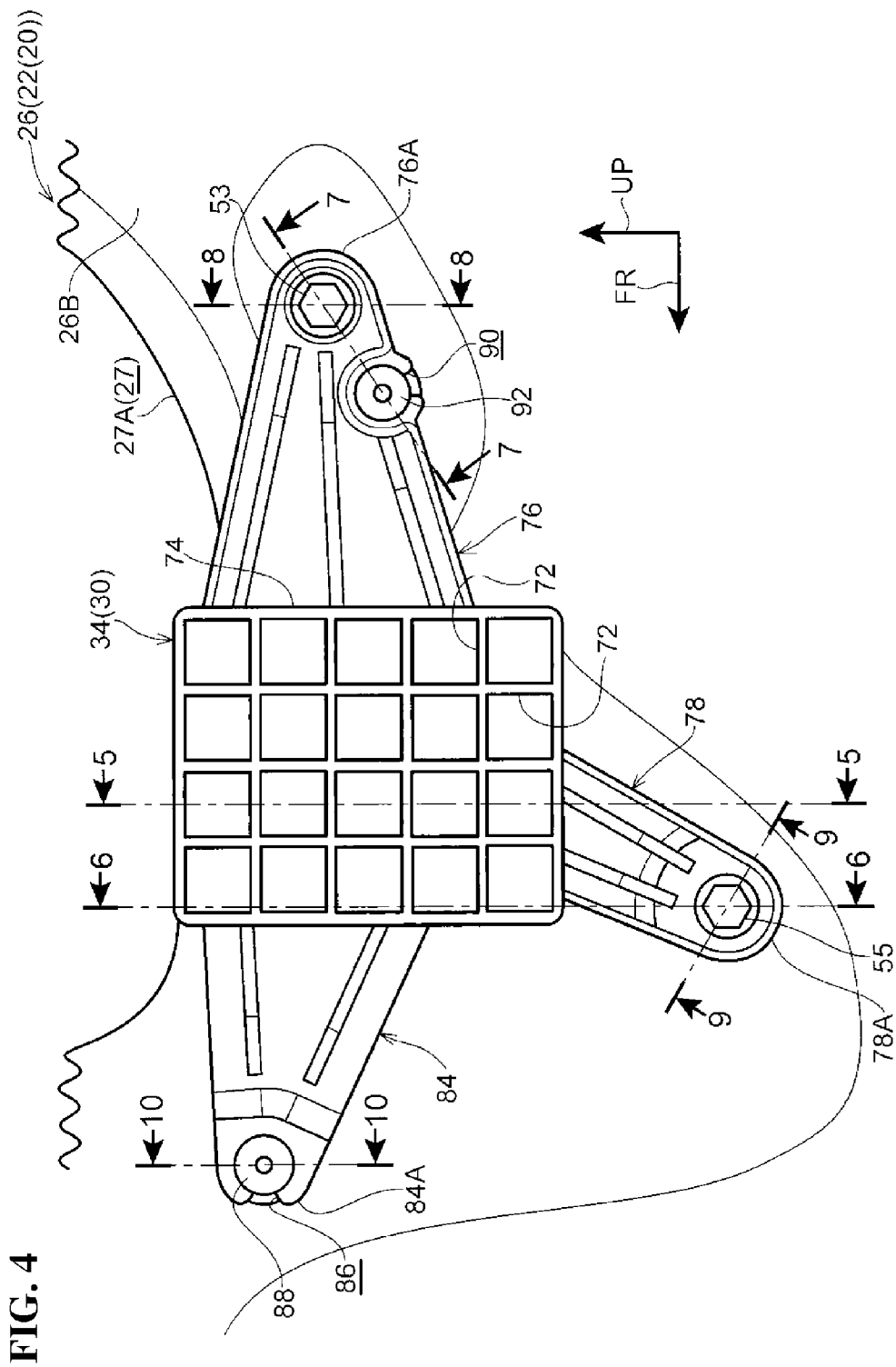
FIG. 4 is a plan view of the second load transmission member seen from the inside of the auto body according to the first embodiment.

As shown in FIG. 3 and FIG. 4, the attachment portion 76 is a plate-like portion provided to stand on one wall portion (the right side wall portion in FIG. 3 and FIG. 4) of the surrounding wall 74, and at a tip portion 76A, there is formed an insertion hole 80 (see FIG. 8) into which a fastener 53 is inserted. Specifically, the attachment portion 76 is provided in a position substantially corresponding to the attachment portion 48 of the outside load transmission member 32 in a state wherein the inside load transmission member 34 is attached to the inner panel 26.

On the other hand, the attachment portion 78 is a plate-like portion provided to stand on a wall portion (the lower wall portion in FIG. 3 and FIG. 4) adjacent to the wall portion where the attachment portion 76 of the surrounding wall 74 is provided, and in a tip portion 78A, there is formed an insertion hole 82 (see FIG. 9) into which the fastener 55 is inserted.

The insertion holes 80 and 82 respectively provided in the attachment portions 76 and 78 are provided at positions respectively corresponding to the attachment holes 28 and 29 provided in the inner panel 26. Incidentally, in the present embodiment, a diameter of the insertion hole 80 is larger than that of the insertion hole 54, and a diameter of the insertion hole 82 is larger than that of the insertion hole 56. Also, the insertion hole 82 is a long hole for adjusting an attachment position.

Also, a plate-like portion 84 is provided to stand on a wall portion (a left side wall portion in FIG. 3) on a side opposite to a wall portion where the attachment portion 76 of the surrounding wall 74 is provided. At a tip portion 84A of the plate-like portion 84, there is formed a C-shaped opening portion 86 (see FIG. 4 and FIG. 10) in which one portion is open. A trim clip 88 is fitted into the opening portion 86. A tip portion of the trim clip 88 is attached to a clip hole 26C provided in the inner panel 26. Specifically, the diameter-reducable tip portion of the trim clip 88 is inserted into the clip hole 26C in a reduced diameter state, and is restored from the reduced diameter state so as to engage with a marginal portion of the clip hole 26C to be attached to the clip hole 26C.

Also, in the attachment portion 76, there is formed a C-shaped opening portion 90 (see FIG. 4 and FIG. 7) in which one portion is open. A trim clip 92 is fitted into the opening portion 90. A tip portion of the trim clip 92 is attached to a clip hole 26D provided in the inner panel 26. Specifically, the diameter-reducable tip portion of the trim clip 92 is inserted into the clip hole 26D in a reduced diameter state, and is restored from the reduced diameter state so as to engage with a marginal portion of the clip hole 26D to be attached to the clip hole 26D.

Also, the trim clips 88 and 92 are respectively attached to the clip holes 26C and 26D, so that the inside load transmission member 34 is temporarily attached to the inner panel 26 in a state wherein the attachment holes 28 and 29, and the insertion holes 80 and 82 are respectively positioned. Incidentally, the trim clips 88 and 92 of the present embodiment are one example of the temporary attachment device of the present invention.

Next, procedures of attaching the load transmission member 30 to the inner panel 26 will be explained.

First, the hooking portion 42 of the outside load transmission member 32 is hooked on the marginal portion 27A of the opening 27 of the inner panel 26 from a face 26A side of the inner panel 26, and the claw portions 44 and 46 are respectively engaged with (hooked on) the attachment holes 28 and 29 of the inner panel 26 to temporarily attach the outside load transmission member 32 to the inner panel 26.

Next, the trim clips 88 and 92 mounted on the inside load transmission member 34 are respectively attached to the clip holes 26C and 26D of the inner panel 26 from a face 26B side of the inner panel 26 to temporarily attach the inside load transmission member 34 to the inner panel 26.

Then, in a state wherein the outside load transmission member 32 and the inside load transmission member 34 are temporarily attached by sandwiching the inner panel 26, the fastener 53 to which a washer is attached is twisted into the insertion hole 54 from the inside of the auto body through the insertion hole 80 and the attachment hole 28, and the fastener 55 to which a washer is attached is twisted into the insertion hole 56 through the insertion hole 82 and the attachment hole 29. Thereby, the outside load transmission member 32 and the inside load transmission member 34 are fastened in a state of sandwiching the inner panel 26. Namely, the load transmission member 30 is attached to the inner panel 26. Incidentally, the fasteners 53 and 55, the insertion holes 54 and 56, and the insertion holes 80 and 82 of the present embodiment are examples of an engagement device of the present invention.

Incidentally, regarding procedures of temporarily attaching the outside load transmission member 32 and the inside load transmission member 34 to the inner panel 26, after the inside load transmission member 34 is temporarily attached to the face 26B of the inner panel 26, the outside load transmission member 32 may be temporarily attached to the face 26A of the inner panel 26.

Next, a flow of transmitting the load from the outside of the auto body to the auto body 20 using the load transmission member 30 will be explained.

As shown in FIG. 14, for example, in a case wherein a collision object K such as another vehicle and the like collides with the rear side door 22 toward the inside of the width of the auto body (an arrow A direction in FIG. 14) from the outside in the width direction of the auto body, the impact beam 23 receives a collision load so as to reduce a deformation in an inward direction of an automobile interior of the rear side door 22. The collision load which the impact beam 23 receives is transmitted to the auto body 20 from a connecting portion between the rear side door 22 and the auto body 20 to be absorbed (dispersed). On the other hand, in a case wherein the impact beam 23 or the outer panel 24 is deformed by receiving the collision load, and abuts against the outside load transmission member 32, one portion of the collision load is transmitted to the outside load transmission member 32. Here, the collision load received by the outside load transmission member 32 is transmitted to the inside load transmission member 34 through the inner panel 26. Then, the collision load received by the inside load transmission member 34 is transmitted to a reinforcement 21 and the like on an under side fixed to the auto body 20 through the door interior material 25, and is absorbed (dispersed) by the auto body 20. Consequently, even in a case wherein the collision object K collides with the rear side door 22 of the auto body 20 toward the inside of the width of the auto body from the outside in the width direction of the auto body, the deformation of the rear side door 22 to the inside in the width direction of the auto body is controlled, i.e., an automobile interior space is maintained.

In the load transmission member 30 of the present embodiment, the inner panel 26 is sandwiched by the outside load transmission member 32 and the inside load transmission member 34, so that an efficiency of the load transmission is difficult to change by a positional relationship between the ribs 38 of the outside load transmission member 32 and the ribs 72 of the inside load transmission member 34, and the load from the outside load transmission member 32 is stably transmitted to the inside load transmission member 34 through the inner panel 26.

Next, an operation and an effect of the load transmission member 30 of the present embodiment will be explained.

In the load transmission member 30 of the present embodiment, the outside load transmission member 32 can be temporarily attached to the face 26A of the inner panel 26 using the hooking portion 42 and the claw portions 44 and 46, and the inside load transmission member 34 can be temporarily attached to the face 26B of the inner panel 26 using the trim clips 88 and 92, so that, for example, compared to a structure which cannot temporarily attach at least one of the outside load transmission member 32 or the inside load transmission member 34, an attachment operation of the load transmission member 30 to the inner panel 26 becomes easy. Especially, in the outside load transmission member 32, the outside load transmission member 32 can be temporarily attached to the inner panel 26 by a simple operation in that after the hooking portion 42 is hooked on the marginal portion 27A of the opening 27 of the inner panel 26, the claw portion 44 is engaged with the marginal portion 28A of the attachment hole 28 of the inner panel 26, and the claw portion 46 is engaged with the marginal portion 29A of the attachment hole 29 of the inner panel 26. Also, in the inside load transmission member 34, the inside load transmission member 34 can be temporarily attached to the inner panel 26 by a simple operation in that the trim clip 88 is attached to the clip hole 26C of the inner panel 26 (the tip portion of the trim clip 88 is engaged with the marginal portion of the clip hole 26C), and the trim clip 92 is attached to the clip hole 26D of the inner panel 26 (the tip portion of the trim clip 92 is engaged with the marginal portion of the clip hole 26D).

In the load transmission member 30 of the present embodiment, the outside load transmission member 32 and the inside load transmission member 34 are fastened in the state of sandwiching the inner panel 26 using the fasteners 53 and 55, and the like, so that the outside load transmission member 32 and the inside load transmission member 34 are firmly fixed to the inner panel 26. Consequently, when the load is transmitted to the inside load transmission member 34 through the inner panel 26 from the outside load transmission member 32, a positional displacement between the outside load transmission member 32 and the inside load transmission member 34 is controlled, and the load from the outside load transmission member 32 can be reliably transmitted to the inside load transmission member 34.

Also, in the load transmission member 30 of the present embodiment, the insertion hole 54 and the attachment hole 28 are positioned by inserting the pair of protrusions 58 provided to stand in the marginal portion of the insertion hole 54 of the outside load transmission member 32 into the attachment hole 28, and the insertion hole 56 and the attachment hole 29 are positioned by inserting the pair of protrusions 62 provided to stand in the marginal portion of the insertion hole 56 into the attachment hole 29. Namely, in the present embodiment, the insertion holes 54 and 56 of the outside load transmission member 32 and the attachment holes 28 and 29 can be easily positioned. Consequently, a fastening operation between the outside load transmission member 32 and the inside load transmission member 34 using the fasteners 53 and 55 becomes easy, and the attachment operation of the load transmission member 30 to the inner panel 26 becomes easy further.

Also, moreover, in the load transmission member 30 of the present embodiment, the handle portion 52 is provided in the outside load transmission member 32 so as to temporarily attach the outside load transmission member 32 to the inner panel 26 while holding the handle portion 52, so that the attachment operation of the load transmission member 30 to the inner panel 26 becomes easy further.

Also, in the load transmission member 30 of the present embodiment, the fastener 53 is twisted into the insertion hole through the insertion hole 80 of the outside load transmission member 32 and the attachment hole 28 of the inner panel 26 from the inside of the auto body, and the fastener 55 is twisted into the insertion hole 56 through the insertion hole 82 of the outside load transmission member 32 and the attachment hole 29 of the inner panel 26, so that the outside load transmission member 32 and the inside load transmission member 34 can be fastened. Namely, the outside load transmission member 32 and the inside load transmission member 34 can be fastened by the operation from one side, so that an operation of attaching the outside load transmission member 32 and the inside load transmission member 34 to the inner panel 26 becomes easy.

Also, moreover, in the load transmission member 30 of the present embodiment, at tip portion sides of the positioning protrusions 58 and 62, there are respectively provided the claw portions 44 and 46, so that, for example, compared to a case wherein the positioning protrusion and a temporarily attaching claw portion are separately provided, a structure of the outside load transmission member 32 can be simplified, and moreover, an increase of the number of the holes formed in the inner panel 26 can be controlled.

Other Embodiments

The aforementioned embodiment has the structure such that the hooking portion 42 is hooked on the marginal portion 27A of the opening 27 of the inner panel 26; however, the present invention is not limited to the aforementioned structure. For example, a dedicated portion (one example of the hooked portion of the present invention) for hooking the hooking portion 42 may be provided on the face 26A of the inner panel 26 to have a structure of hooking the hooking portion 42 on the dedicated portion.

The aforementioned embodiment has the structure in that the fastener 53 is twisted into the insertion hole 54 through the insertion hole 80 and the attachment hole 28, and the fastener 55 is twisted into the insertion hole 56 through the insertion hole 82 and the attachment hole 29 so as to fasten the outside load transmission member 32 and the inside load transmission member 34; however, the present invention is not limited to the aforementioned structure. For example, the present invention may have a structure such that the fastener 53 is twisted into a nut member (not shown in the drawings) through the insertion hole 80, the attachment hole 28, and the insertion hole 54, and the fastener 55 is twisted into another nut member (not shown in the drawings) through the insertion hole 82, the attachment hole 29, and the insertion hole 56 so as to fasten the outside load transmission member 32 and the inside load transmission member 34.

Also, the aforementioned embodiment has the structure of fastening the outside load transmission member 32 and the inside load transmission member 34 using the fastener 53 and the fastener 55; however, the present invention is not limited to the aforementioned structure. For example, a locking portion may be provided in one of the outside load transmission member or the inside load transmission member 34, and a locked portion locked in the locking portion may be provided in the other of the outside load transmission member 32 or the inside load transmission member 34, so that the outside load transmission member 32 and the inside load transmission member 34 may be locked (engaged) in the state of sandwiching the inner panel 26 using the aforementioned locking portion and locked portion. Incidentally, as for the locking portion and the locked portion, for example, there may be an elastically deformable locking claw, and a locking hole wherein the locking claw is hooked on a marginal portion.

Also, moreover, the aforementioned embodiment has a structure of fastening the attachment portion 48 of the outside load transmission member 32 and the attachment portion 76 of the inside load transmission member 34 using the fastener 53 at the same position of the inner panel 26 (the position of the attachment hole 28), and of fastening the attachment portion 50 and the attachment portion 78 using the fastener 55 at the same position of the inner panel 26 (the position of the attachment hole 29); however, the present invention is not limited to the aforementioned structure. For example, the attachment portion 48 of the outside load transmission member 32 and the attachment portion 76 of the inside load transmission member 34 may be fastened using the fastener at separate positions of the inner panel 26; the attachment portion 50 and the attachment portion 78 may be fastened using the fastener at separate positions of the inner panel 26; or the attachment portion 48 and the attachment portion 76, and the attachment portion 50 and the attachment portion 78 may be fastened using the fastener at separate positions of the inner panel 26, respectively.

The aforementioned embodiment has the structure of providing the claw portion 44 on the tip portion side of the protrusion 58, and providing the claw portion 46 on the tip portion side of the protrusion 62; however, the present invention is not limited to the aforementioned structure. The present invention may have a structure wherein the protrusion 58 and the claw portion 44 are provided separately, and the protrusion 62 and the claw portion 46 are provided separately.

The aforementioned embodiment has the structure wherein the hooking portion 42 is provided in the outside load transmission member 32; however, the present invention is not limited to the aforementioned structure, and may have a structure of providing the hooking portion in the inside load transmission member 34, or a structure of providing the hooking portion respectively in the outside load transmission member 32 and the inside load transmission member 34.

Also, the aforementioned embodiment has the structure wherein the positioning protrusions 58 and 62 relative to the attachment holes 28 and 29 are respectively provided in the respective marginal portions of the insertion holes 54 and 56 of the outside load transmission member 32, and the claw portions 44 and 46 are provided respectively on the tip portion sides of the protrusions 58 and 62; however, the present invention is not limited to the aforementioned structure. For example, the present invention may have a structure wherein the positioning protrusions relative to the attachment holes 28 and 29 are provided respectively on the respective marginal portions of the insertion holes 80 and 82 of the inside load transmission member 34, and the claw portions 44 and 46 are respectively provided on the tip portion sides of the protrusions.

The aforementioned embodiment has the structure wherein the handle portion 52 is provided in the wall portion (the left side wall portion in FIG. 3) on the side opposite to the wall portion in which the attachment portion 50 of the surrounding wall 40 is provided; however, the present invention is not limited to the aforementioned structure. For example, the present invention may have a structure that the handle portion 52 is provided on another wall portion of the surrounding wall 40. Also, in addition to the outside load transmission member 32, the present invention may have a structure such that the handle portion is provided on a wall portion of the surrounding wall 74 of the inside load transmission member 34; or a structure that the handle portion is provided only in the inside load transmission member 34.

Incidentally, the load transmission member 30 of the present embodiment can be applied to an inner panel of a front side door, an inner panel of a back door, or the like other than the inner panel of the rear side door 22 of the auto body 20 as well. Also, moreover, the load transmission member 30 of the present embodiment can be applied to a panel member other than the auto body of the automobile as well.

The disclosure of Japanese Patent Application No. 2015-032260, filed on Feb. 20, 2015, is incorporated in the application.

While the invention has been explained with reference to the specific embodiments of the invention, the explanation is illustrative and the invention is limited only by the appended claims.

What is claimed is:

1. A load transmission member, comprising:
   a panel member;
   a first load transmission member attached to one face of the panel member;
   a second load transmission member attached to another face of the panel member at a position corresponding to the first load transmission member so that a load from the first load transmission member is transmitted through the panel member to the second load transmission member; and
   a hooking portion as a temporary attachment device provided integrally with the first load transmission member on a side thereof facing said one face of the panel member, the hooking portion being hooked on a hooked portion of the panel member for temporarily attaching the first load transmission member to the panel member,
   wherein the first load transmission member comprises a plate portion, a plurality of ribs provided to stand on one surface of the plate portion, a surrounding wall surrounding the plate portion and the plurality of ribs, and at least two attachment portions extending laterally outwardly from the surrounding wall,
   the second load transmission member comprises a plate portion, a plurality of ribs provided to stand on one surface of the plate portion, a surrounding wall surrounding the plate portion and the plurality of ribs, and at least two attachment portions extending laterally outwardly from the surrounding wall thereof, and
   the surrounding walls, and the at least two attachment portions of the first and second load transmission members are arranged to substantially face each other with the panel member therebetween.

2. A load transmission member according to claim 1, further comprising a claw portion as another temporary attachment device engaging with a marginal portion of an engagement hole provided in the panel member.

3. A load transmission member according to claim 1, further comprising an engagement device engaging the first load transmission member with the second load transmission member in a state of sandwiching the panel member.

4. A load transmission member according to claim 3, wherein the engagement device comprises a fastener for fastening the first load transmission member and the second load transmission member in a state of sandwiching the panel member by passing through an attachment hole provided in the panel member and attaching the first load transmission member and the second load transmission member to the panel member; and insertion holes respectively provided in the first load transmission member and the second load transmission member, into which the fastener is inserted.

5. A load transmission member according to claim 4, wherein at least one of the first load transmission member or the second load transmission member includes a positioning protrusion inserted into the attachment hole at a marginal portion of the insertion hole.

6. A load transmission member according to claim 1, wherein at least one of the first load transmission member or the second load transmission member includes a handle portion.

7. A load transmission member according to claim 1, wherein the panel member is an inner panel for an automobile door, the first load transmission member is attached to an outside of the inner panel of an auto body, and the second load transmission member is attached to an inside of the inner panel.

8. A load transmission member according to claim 1, wherein the at least two attachment portions of the first load transmission member include attachment claws engaging holes of the panel member to temporally engage the first load transmission member to the panel member, and the at least two attachment portions of the second load transmission member include insertion holes receiving the attachment claws attached to the panel member therein.

9. A load transmission member according to claim 8, further comprising trim clips passing through holes of the attachment claws and the insertion holes to temporally fix the first and second load transmission members with the panel member therebetween.

* * * * *